(12) United States Patent
Strong, III et al.

(10) Patent No.: US 7,233,472 B2
(45) Date of Patent: Jun. 19, 2007

(54) HIGHLY EFFICIENT LINE TRANSIENT PROTECTION CIRCUIT FOR HIGH POWER LOADS

(75) Inventors: Maurice L. Strong, III, Prospect Heights, IL (US); William H. Tang, Bolingbrook, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 587 days.

(21) Appl. No.: 10/833,863

(22) Filed: Apr. 28, 2004

(65) Prior Publication Data

US 2005/0243494 A1 Nov. 3, 2005

(51) Int. Cl.
*H02H 3/00* (2006.01)
*H02H 7/00* (2006.01)
*H02H 9/02* (2006.01)
*H02H 3/22* (2006.01)

(52) U.S. Cl. ........................ 361/100; 361/111
(58) Field of Classification Search ............... 361/100, 361/111
See application file for complete search history.

(56) References Cited

U.S. PATENT DOCUMENTS 7,068,485 B2 * 6/2006 Ishikawa et al. ........... 361/93.9

* cited by examiner

*Primary Examiner*—Stephen W. Jackson
*Assistant Examiner*—Dharti H. Patel
(74) *Attorney, Agent, or Firm*—Stetina Brunda Garred & Brucker

(57) ABSTRACT

A highly efficient line transient protection circuit is provided for high power loads that are designed to operate through a high line transient. The transient protection circuit for high power loads is provided with a primary leg circuit, a load circuit and a secondary circuit. The load circuit may be a switching regulator circuit, a load circuit containing an oscillator, a push-pull circuit, a boost converter circuit, a buck converter circuit or the like. The transient protection circuit is provided with a simple driver circuit to turn on a bypass n-channel MOSFET. It operates at a higher efficiency; I.E., conduction losses are minimized during normal input voltage conditions. Furthermore, the transient protection circuit provides a programmable voltage clamp which is implemented through selecting zener diode VR1. The transient protection may be used to protect medium to large current circuits from line transients. Additionally, the transient protection circuit it is suitable for applications in loads that have to operate through a high line transient (e.g. military, medical, etc.).

29 Claims, 12 Drawing Sheets

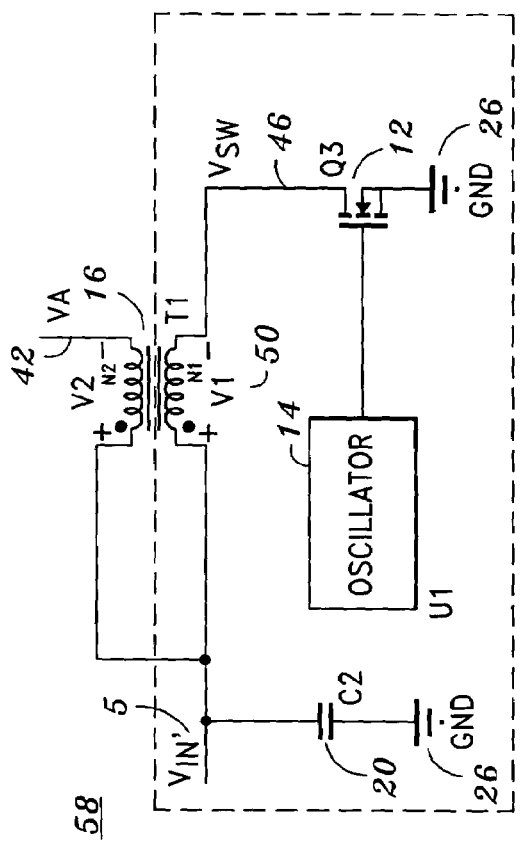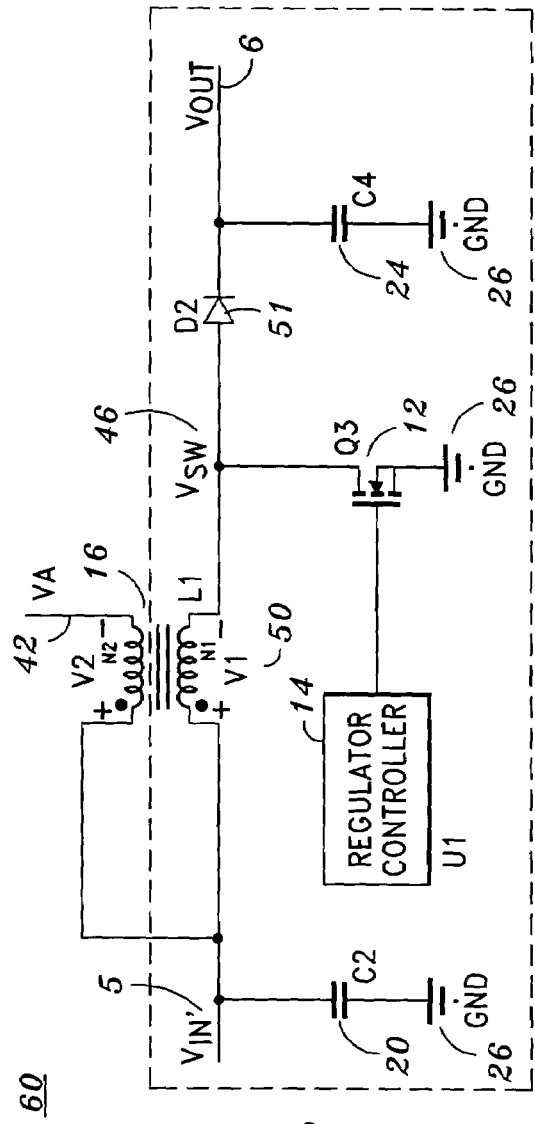
Fig. 8A
Fig. 8B

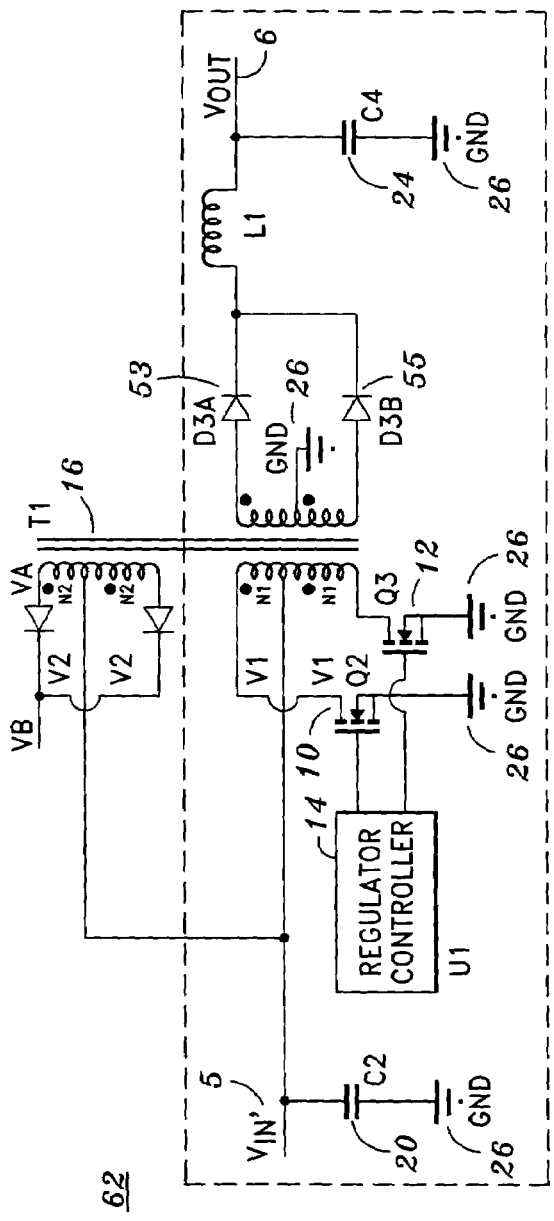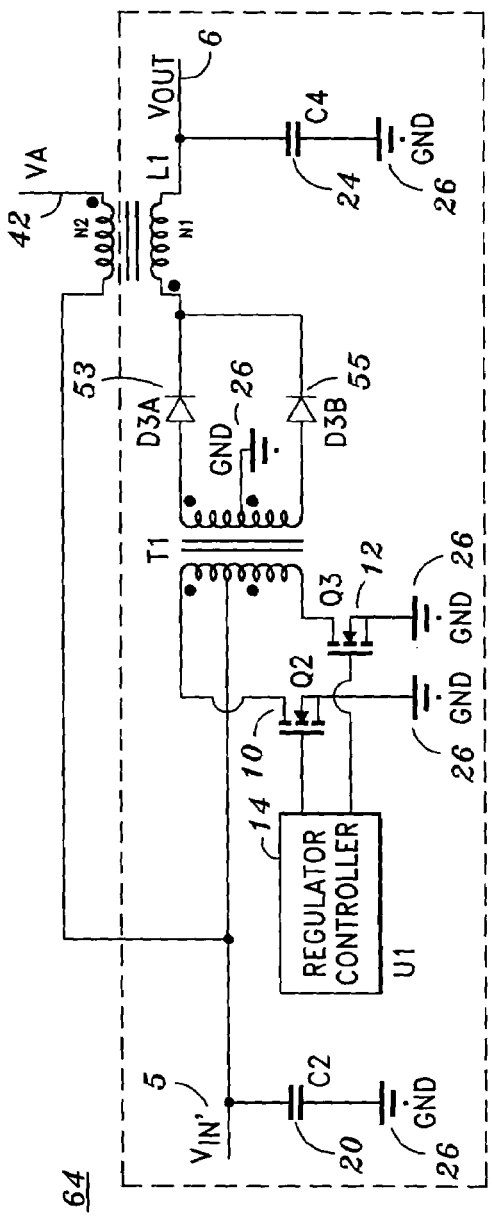

HIGHLY EFFICIENT LINE TRANSIENT PROTECTION CIRCUIT FOR HIGH POWER LOADS

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to line transient protection circuits. In particular, the present invention relates to highly efficient line transient protection circuits for high power loads that are designed to operate through a high line transient (e.g. military and medical applications, etc.).

2. Background of the Invention

In general, transient electric phenomena occur, for instance, when a load is suddenly changed and an appreciable time elapses before the power level and circuit adapt to the new conditions. The voltages and currents during the intermediate time are known as transient. A transient may further be described as the momentary departure of a characteristic from steady-state conditions and back to steady-state conditions as a result of a system disturbance, such as a load or line change.

In high power load applications, line transient protection circuits (or voltage limiting circuits) have traditionally been designed using a power bipolar transistor. One well-known bipolar approach is the darlington power transistor transient protection circuit (1) is shown in FIG. 1 The darlington configuration typically includes a primary circuit having an input $V_{IN}$ (4), a bipolar transistor Q1A and Q1B (54) and an output $V_{IN}'$ (5). A secondary leg connected to the primary leg between $V_{IN}$ and the bipolar transistor (54) includes a resistor R1 (34). The secondary leg is then fed into the bipolar transistor (54). A zener diode VR1 (28) is further arranged between the resistor R1 and the bipolar transistor (54) where the anode of VR1 is grounded (26). Additionally, the transient protected load depicted as RL circuit leg (50) is arranged between the bipolar transistor (54) and $V_{IN}'$ where the return RL leg is grounded (26). However, a major disadvantage of the darlington circuit (1) is that it is not very efficient with respect to power consumption. In particular, at mid to high current levels, the power bipolar transistor suffers from poor current gain requiring high base current and high forward collector to emitter voltage drop, thus, is typically inefficient.

Another traditional approach to transient protection circuitry is to use a power MOSFET transient protection circuit as shown in FIG. 2. The power MOSFET transient protection circuit (2) typically includes a primary circuit having an input $V_{IN}$ (4), an n-channel enhancement power MOSFET Q1 (8) and an output $V_{IN}'$ (5). A secondary leg connected to the primary leg between $V_{IN}$ and Q1 includes a resistor R1 (34). The secondary leg is then fed into the gate connection of Q1. A zener diode VR1 is further arranged between the resistor R1 and Q1 where the anode end of the zener diode is grounded (26). Additionally, a load, depicted as an RL circuit leg 50 is arranged between Q1 and $V_{IN}'$ where the return of the RL leg is grounded (26). However, a major disadvantage of the power MOSFET transient protection circuit (2) is that it is typically more inefficient with respect to power consumption than that of the darlington transient protection circuit (1). Thus, one of the overall primary disadvantages of the aforementioned designs is that they are not power efficient.

It would be advantageous to provide a highly efficient line transient protection circuit for high power loads. In particular, it would be beneficial to provide a transient protection circuit that is adapted to operate through a high transient line. It would further be ideal to provide a transient protection circuit that can be used to protect medium to large current circuit from line transients.

BRIEF SUMMARY OF THE INVENTION

The aforementioned disadvantages are overcome by providing a highly efficient line transient circuit for high power loads. The present invention provides a transient protection circuit which can serve as a transient protection circuit for applications that require loads to operate through a high line transient. It uses a novel approach in boosting the gate voltage of Q1 to fully enhanced Q1 therefore reducing conduction loss.

According to one exemplary embodiment of the present invention, a transient protection circuit for high power loads is provided comprising a primary circuit leg having an input $V_{IN}$ in electrical communication with a drain of a MOSFET Q1 and a source of the MOSFET Q1 being an output of the primary circuit. The transient protection circuit also includes a load circuit having an input $V_{IN}'$ in electrical communication with the output of the primary circuit leg, the load circuit having a winding N1 forming a portion of one of an inductor L1 or a transformer T1. Also, the transient protection circuit includes a secondary circuit in electrical communication with a gate of the MOSFET Q1 and in electrical communication with a zener diode VR1 and wherein the zener diode VR1 is electrically grounded, a circuit leg $V_{GATE}$ in electrical communication with a node between the gate of MOSFET Q1 and the zener diode VR1 being in electrical communication with a resistor R2, a circuit leg $V_B$ in electrical communication with resistor R2 and in electrical communication with a diode D1, a circuit leg $V_A$ in electrical communication with diode D1 and with a first terminal of a winding N2 forming a portion of the one of an inductor L1 or a transformer T1, and wherein another terminal of the N2 winding is in electrical communication with the input $V_{IN}'$ of the load circuit.

According to another aspect of the present invention, the load circuit further comprises an output $V_{OUT}$. According to another aspect of the present invention, the load circuit comprises one of a switching regulator circuit, oscillator circuit, a push-pull circuit, a boost converter circuit or a buck converter circuit.

According to still another aspect of the present invention, the buck converter comprises the input $V_{IN}'$ in electrical communication with a drain of a FET Q2, a circuit leg $V_{SW}$ in electrical communication with a source of FET Q2 and in electrical communication with a terminal of the winding N1 of the inductor L1, the output $V_{OUT}$ in electrical communication with another terminal of the winding N1, a FET Q3 having a drain in electrical communication with the circuit leg $V_{SW}$ and source of the FET Q3 being electrically grounded, a regulator controller U1 in electrical communication with a gate of the FET Q2 and with a gate of the FET Q3 and wherein a source of the FET Q3 is electrically grounded.

Further, according to other aspects of the present invention, the transient protection circuit further comprises a capacitor C2 in electrical communication with the input $V_{IN}'$ and further electrically grounded. Moreover, the present invention may further comprise a capacitor C4 in electrical communication with the output $V_{OUT}$ and further electrically grounded. In another aspect of the present invention, a resistor R1 in electrical communication with the input $V_{IN}$ upstream the drain of MOSFET Q1 and in electrical communication with the secondary circuit leg upstream the node between the gate of MOSFET Q1 and the zener diode VR1.

According to another aspect of the present invention, the transient protection circuit further comprises a capacitor C3 in electrical communication with the primary circuit downstream the source of MOSFET Q1 and in electrical communication with the circuit leg $V_{GATE}$ upstream the resistor R2. Another aspect of the present invention includes the transient protection circuit further comprising a zener diode VR2 in electrical communication with the primary circuit downstream the source of MOSFET Q1 and in electrical communication with the circuit leg $V_{GATE}$ upstream the resistor R2. The transient protection circuit may further comprise a capacitor C1 in electrical communication with the input $V_{IN}$ upstream the drain of Q1 and further electrically grounded. And according to a further aspect of the present invention, a programmable voltage clamp is implemented through zener diode VR1.

According to another exemplary embodiment of the present invention, a transient protection circuit for high power loads comprising a primary circuit leg comprising an input $V_{IN}$ in electrical communication with a drain of a MOSFET Q1 and a source of the MOSFET Q1 being an output of the primary circuit, and a capacitor C1 in electrical communication with the input $V_{IN}$ upstream the drain of Q1 and further electrically grounded. The transient protection circuit further includes a load circuit comprising an input $V_{IN}'$, a winding N1 forming a portion of an inductor L, and an output $V_{OUT}$, wherein input $V_{IN}'$ is in electrical communication with the output of the primary circuit. The transient protection circuit further includes a secondary circuit in electrical communication with a gate of the MOSFET Q1 and in electrical communication with a zener diode VR1 and wherein the zener diode VR1 is electrically grounded, a circuit leg $V_{GATE}$ in electrical communication with a node between the gate of MOSFET Q1 and the zener diode VR1 and in electrical communication with a resistor R2, a circuit leg $V_B$ in electrical communication with resistor R2 and in electrical communication with a diode D1, a circuit leg $V_A$ in electrical communication with diode D1 and with a negative terminal of a winding N2 forming a portion of the inductor L1 and wherein a positive terminal of the N2 winding is in electrical communication with the input VIN', a capacitor C3 in electrical communication with the primary circuit downstream the source of MOSFET Q1 and in electrical communication with the circuit leg $V_{GATE}$ upstream the resistor R2, a zener diode VR2 in electrical communication with the primary circuit leg $V_{GATE}$ upstream the capacitor C3, and a resistor R1 in electrical communication with the input $V_{IN}$ upstream the drain of MOSFET Q1 and in electrical communication with the secondary circuit leg upstream the node between the gate of MOSFET Q1 and the zener diode VR1.

According to yet another exemplary embodiment of the present invention, a transient protection circuit for high power loads is provided comprising a primary circuit leg comprising an input $V_{IN}$ in electrical communication with a drain of a MOSFET Q1 and a source of the MOSFET Q1 being an output of the primary circuit, and a capacitor C1 in electrical communication with the input $V_{IN}$ upstream the drain of Q1 and further electrically grounded. The transient protection circuit further includes a load circuit comprising a buck converter including an input $V_{IN}'$ in electrical communication with a drain of a FET Q2, a circuit leg $V_{SW}$ in electrical communication with a source of FET Q2 and in electrical communication with a positive terminal of a winding N1 of an inductor L1, an output $V_{OUT}$ in electrical communication with a negative terminal of the winding N1, a FET Q3 having a drain in electrical communication with the circuit leg $V_{SW}$ and source of the FET Q3 being electrically grounded, a regulator controller U1 in electrical communication with a gate of the FET Q2 and with a gate of the FET Q3 and wherein a source of the FET Q3 is electrically grounded, a capacitor C2 in electrical communication with the input $V_{IN}'$ and further electrically grounded, and a capacitor C4 in electrical communication with the output $V_{OUT}$ and further electrically grounded. The transient protection circuit further includes a secondary circuit in electrical communication with a gate of the MOSFET Q1 and in electrical communication with a zener diode VR1 and wherein the zener diode VR1 is electrically grounded, a circuit leg $V_{GATE}$ in electrical communication with a node between the gate of MOSFET Q1 and the zener diode VR1 and in electrical communication with a resistor R2, a circuit leg $V_B$ in electrical communication with resistor R2 and in electrical communication with a diode D1, a circuit leg $V_A$ in electrical communication with diode D1 and with a negative terminal of a winding N2 forming a portion of the inductor L1 and wherein a positive terminal of the N2 winding is in electrical communication with the input VIN', a capacitor C3 in electrical communication with the primary circuit downstream the source of MOSFET Q1 and in electrical communication with the circuit leg $V_{GATE}$ upstream the resistor R2, a zener diode VR2 in electrical communication with the primary circuit leg $V_{GATE}$ upstream the capacitor C3, and a resistor R1 in electrical communication with the input $V_{IN}$ upstream the drain of MOSFET Q1 and in electrical communication with the secondary circuit leg upstream the node between the gate of MOSFET Q1 and the zener diode VR1. Additionally, a programmable voltage clamp is implemented through zener diode VR1.

And yet, in still another exemplary embodiment of the present invention, a portion of a transient protection circuit for high power loads is provided including a primary circuit leg having an input $V_{IN}$ in electrical communication with a drain of a MOSFET Q1 and a source of the MOSFET Q1 being an output of the primary circuit adapted to be connected to a load circuit having an input $V_{IN}'$. The transient further includes a secondary circuit in electrical communication with a gate of the MOSFET Q1 and in electrical communication with a zener diode VR1 and wherein the zener diode ZR1 is electrically grounded, a circuit leg $V_{GATE}$ in electrical communication with a node between the gate of MOSFET Q1 and the zener diode VR1 being in electrical communication with a resistor R2, a circuit leg $V_B$ in electrical communication with resistor R2 and in electrical communication with a diode D1, a circuit leg $V_A$ in electrical communication with diode D1 and with a first terminal of a winding N2 forming a portion of the one of an inductor L1 or a transformer T1, and wherein another terminal of the N2 winding is adapted to be in electrical communication with the input VIN' of the load circuit.

According to another aspect of the present aforementioned embodiment, the transient protection circuit further comprises a resistor R1 in electrical communication with the input $V_{IN}$ upstream the drain of MOSFET Q1 and in electrical communication with the secondary circuit leg upstream the node between the gate of MOSFET Q1 and the zener diode VR1. According to another aspect of the present aforementioned embodiment, the transient protection circuit further comprises a capacitor C3 in electrical communication with the primary circuit downstream the source of MOSFET Q1 and in electrical communication with the circuit leg $V_{GATE}$ upstream the resistor R2.

Furthermore, according to another aspect of the present aforementioned embodiment, the transient protection circuit further comprises a zener diode VR2 in electrical communication with the primary circuit downstream the source of MOSFET Q1 and in electrical communication with the circuit leg $V_{GATE}$ upstream the resistor R2. Moreover, according to another aspect of the present aforementioned embodiment, the transient protection circuit further comprises a capacitor C1 in electrical communication with the input $V_{IN}$ upstream the drain of Q1 and further electrically grounded.

The present invention has advantages over traditional circuits by improving efficiency for medium to high power loads. Another advantage of the present invention is that it provides a simple driver circuit to turn on a bypass n-channel MOSFET. Another advantage of the present invention is that it operates at a higher efficiency; I.E., conduction losses are minimized during normal input voltage conditions. A further advantage of the present invention is that it provides a programmable voltage clamp which is implemented through selecting zener diode VR1. And still yet another advantage of the present invention is that it can be used to protect medium to large current circuits from line transients. Additionally, another advantage of the present invention is that it is suitable for applications in loads that have to operate through a high line transient (e.g. military, medical, etc.).

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIGS. 8A-D depict numerous alternative load circuit topologies, according to an aspect of the present invention.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Description of the Exemplary Transient Protection Circuit

Figure 3A:
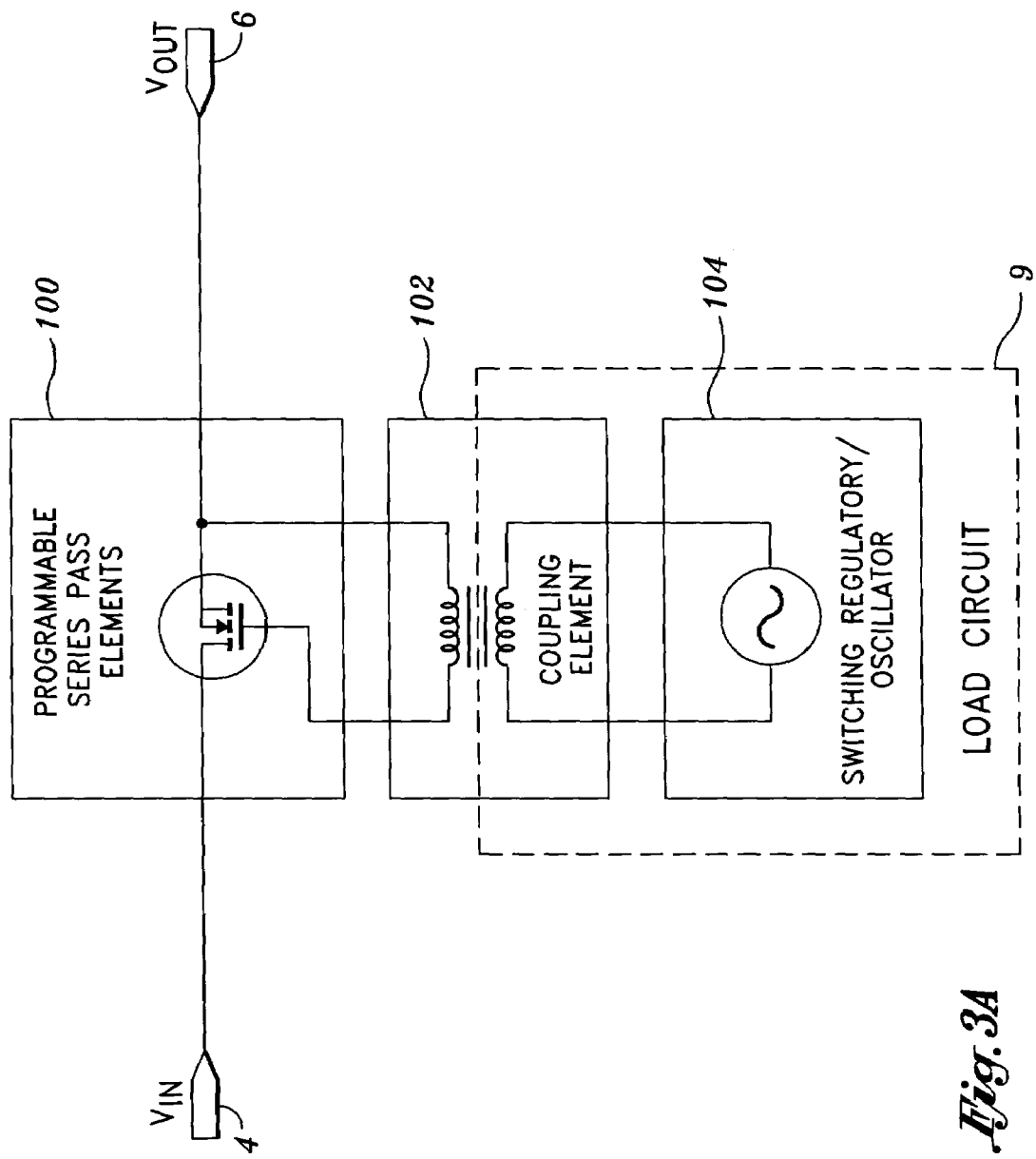
FIG. 3A is a notational depiction of the present invention which is a highly efficient line transient protection circuit for high power loads, according to an aspect of the present invention.

FIG. 3A is a notational depiction of the present invention which is a highly efficient line transient protection circuit (3) for high power loads, according to an aspect of the present invention [hereinafter "transient protection circuit (3)"]. In the most general embodiment, the present invention includes programmable series pass elements 100 having a input $V_{IN}$ 4 and output $V_{OUT}$ 6 coupled to a load circuit 9 including switching regulatory/oscillator 104 by coupling element 102.

Figure 3B:
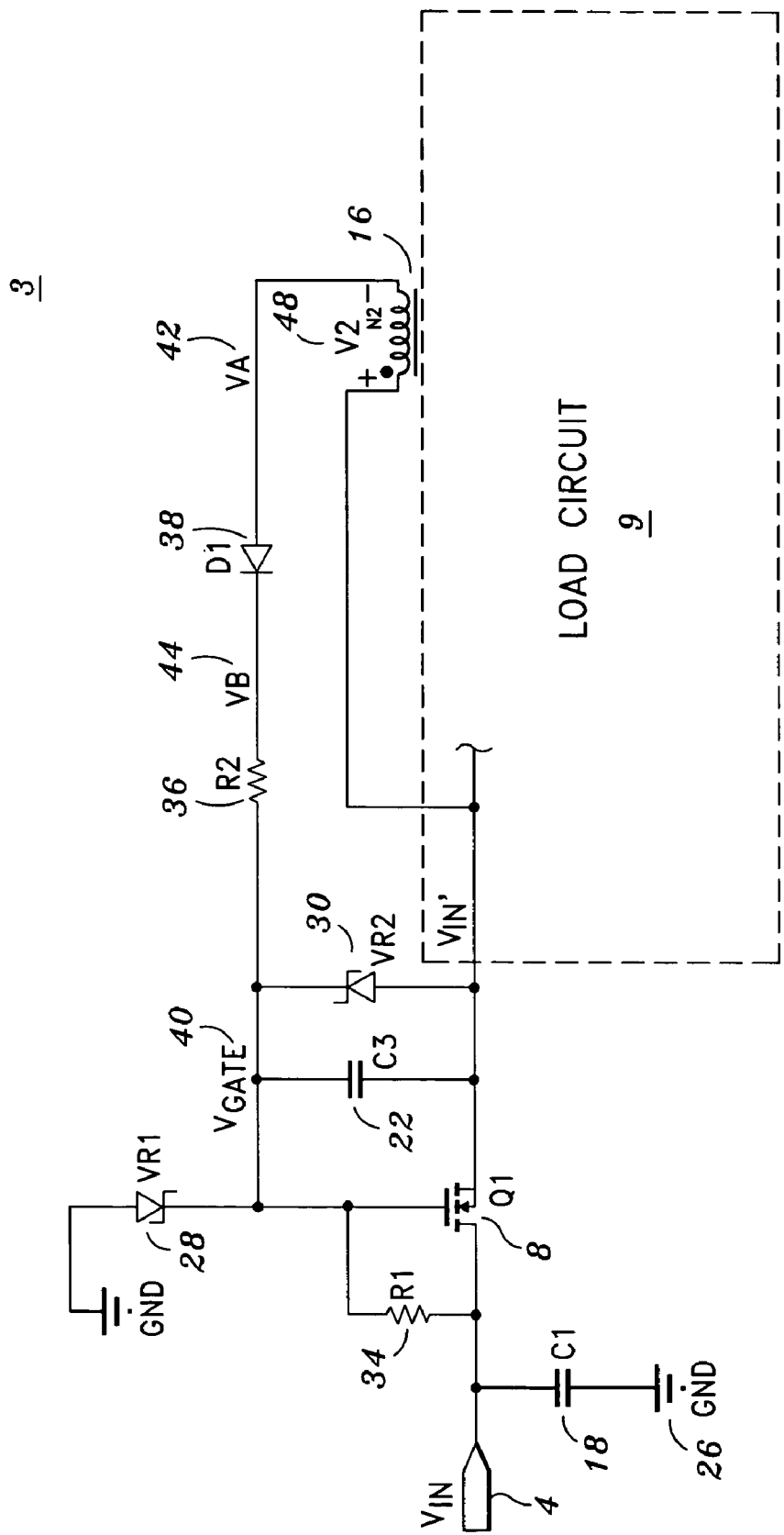
FIG. 3B is an exemplary embodiment of the present invention which is a highly efficient line transient protection circuit for high power loads coupled with a load circuit, according to an aspect of the present invention.

FIG. 3B is a depiction of an exemplary of the present invention which is a highly efficient line transient protection circuit (3) for high power loads coupled with a load circuit (9), according to an aspect of the present invention. The transient protection circuit (3) comprises a primary circuit, a secondary circuit, and a load circuit (9). The primary circuit includes input $V_{IN}$ (4) and an enhancement n-channel power MOSFET Q1 (8). The primary circuit may also include capacitor C1 (18). In particular, the input $V_{IN}$ is electrically connected to the drain of Q1. A circuit leg of the primary circuit is electrically connected to the source of Q1 and the other end of the leg is in electrical communication with an input $V_{IN}'$ of the load circuit (9). The primary circuit also includes a circuit leg which electrically connects between $V_{IN}$ and the drain Q1, which includes a capacitor C1 that is grounded.

Figure 3C:
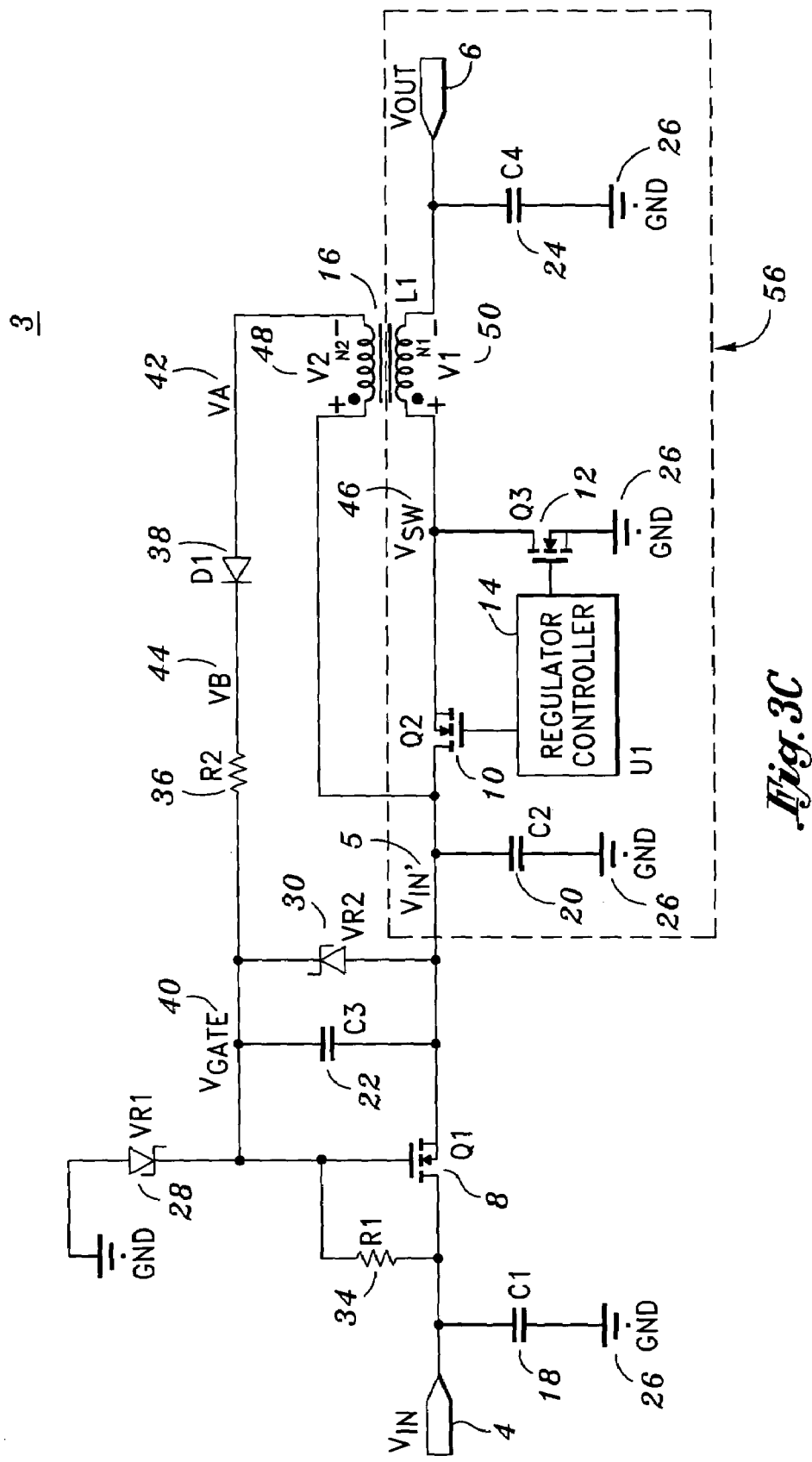
FIG. 3C is an exemplary embodiment of the preferred embodiment of the present invention which is a highly efficient line transient protection circuit for high power loads coupled with a buck converter, according to an aspect of the present invention.

FIG. 3C is an exemplary embodiment of the preferred embodiment of the present invention which is a highly efficient line transient protection circuit (3) for high power loads coupled with a buck converter 56, according to an aspect of the present invention.

Preferably, the exemplary transient protection circuit (3) depicted in FIG. 3C is provided with the load circuit (9) being that of a buck converter (56) composing of input $V_{IN}'$ (5), switching FET Q2 (10), switching FET Q3 (12), regulator controller U1 (14), winding N1 (50) of inductor L1 (or reactor) (16), capacitor C2 (20), capacitor C4 (24) and output $V_{OUT}$ (6). In particular, the primary circuit is in electrical communication with $V_{IN}'$, which is in electrical communication with the drain of Q2. A circuit leg of the buck converter, $V_{SW}$, is in electrical communication with the source of Q2 and is further in electrical communication with the positive (+) terminal of winding N1 of inductor L1. The negative (−) terminal of winding N1 is in electrical communication with the output $V_{OUT}$. The gate of Q2 is in electrical communication with regulator controller U1. Moreover, the drain of switching FET Q3 is in electrical communication with the circuit leg of the buck converter $V_{SW}$ between the source of Q2 and the positive (+) terminal of winding N1, while the source of Q3 is grounded. The gate of Q3 is also in electrical communication with regulator controller U1. Additionally, the capacitor C2 is connected to $V_{IN}'$ and further grounded. Also, the capacitor C4 is connected between the negative (−) terminal of winding N1 of $V_{OUT}$.

A secondary circuit is further provided which includes a circuit leg in electrical communication with the gate of Q1 and in electrical communication with a zener diode VR1 (28) which is then grounded. The secondary circuit leg also includes a circuit leg $V_{GATE}$ which is connected between the gate of Q1 and the zener diode VR1 and further in electrical communication with a resistor R2 (36). Another circuit leg $V_B$ is in electrical communication with R2 and diode D1 (38). Another circuit leg $V_A$ of the secondary circuit, is in electrical communication with D1 and is further electrically connected to a negative (−) terminal of the secondary winding N2 of the inductor L1. Another circuit leg of the secondary leg is further in electrical communication with a positive (+) terminal of winding N2 and also then tied into the load circuit (9) between the node at which C2 is connected and the drain of Q2. Additionally, a capacitor C3 (22) and a zener diode VR2 (30) are both interconnected between the primary and secondary circuit legs between Q1 and Q2 on the primary circuit and to the $V_{GATE}$ circuit leg upstream of R2. Moreover, a resistor R1 (34) is connected between C1 and the drain of Q1 and between the gate Q1 and upstream the $V_{GATE}$ circuit leg.

Theory of Operations of the Exemplary Transient Protection Circuit

When voltage is applied to the input of the circuit $V_{IN}$, the gate of the power MOSFET Q1 is biased up to the same input voltage through resistor R1. This gate voltage forces Q1 to conduct; however, the voltage at the source of Q1 will be a VGS threshold voltage (wherein VGS is the classical specified gate to source voltage necessary to turn on, or enhance the channel of a MOSFET) below that of the gate because Q1 will not be fully enhanced. A typical threshold voltage of an n-channel power MOSFET is 2V to 4V. Therefore, a differential voltage of 2V to 4V exists from drain to source of Q1. This voltage difference across power MOSFET Q1 produces power loss when current passes through it which can be significant when current levels increase.

To overcome this undesirable power loss, a voltage higher than the existing input voltage is generated at the gate to turn the MOSFET Q1 on hard (fully enhanced) and minimize drop between the drain and source of Q1. To generate this higher voltage signal, the transient protection circuit (3) takes advantage of the switching waveform across the buck inductor L1 and develops a higher voltage out of the secondary circuit. The turns ratio of the reactor of inductor L1, N2/N1, can be adjusted such that a higher voltage comes out of the secondary winding when N2>N1. For instance, if N2/N1=2, then V2 is twice that of V1, because winding N2 is equal to twice that of N1.

It is noted that in operational steady-state, V1, is in phase with V2. When V1 is high, V2 is also high. When V1 is low, V2 is also low. However, the un-dotted terminal of the secondary of the reactor, $V_A$, is opposite polarity to that of V2. That is because $V_A = V_{IN}' - V2$. A progression of the waveforms showing V1, V2, and $V_A$ is shown in FIGS. 6A-D.

The input-output switching relationship for the buck converter is given by $$D = \frac{Vout}{Vin}.$$

The buck converter top FET, Q2, is on for time duration DT, where D is the duty ratio and T is the switching period. During Q2's on time, $V_A$ is low, its magnitude given by:

$$V_A = Vin' - V2 \quad 0 \leq t \leq DT \quad Q2:ON$$

When top FET, Q2, is off for duration (1−D)T, $V_A$ is high, its magnitude given by:

$$V_A = Vin' - V2 \quad DT \leq t \leq T \quad Q2:OFF$$

Figure 4:
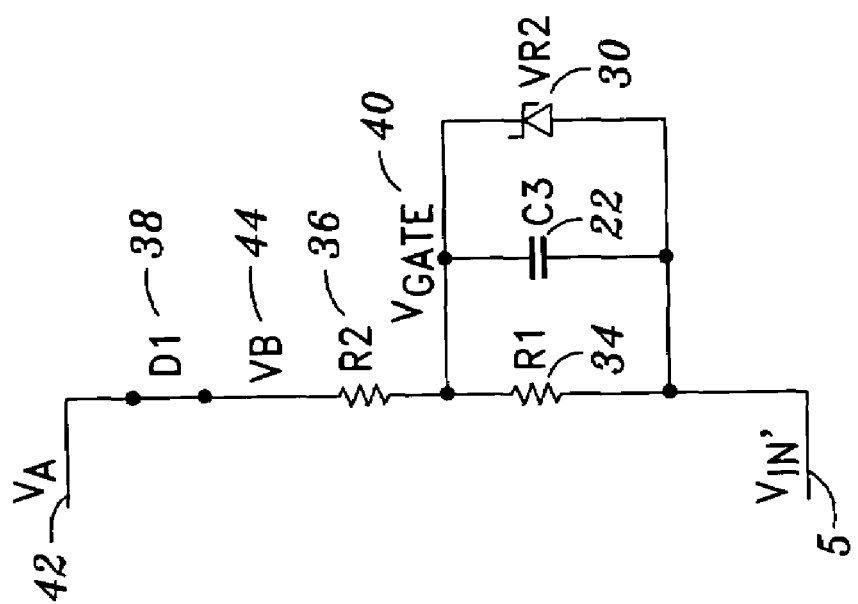
FIG. 4 is an equivalent circuit between $V_A$ and $V_{IN}'$, when Q2 is conducting and the reactor turns ratio N2/N1 and resistor divider R2/R1 is set to boost voltage at the gate of Q1 such that it will be fully enhanced, according to an aspect of the present invention.

When $V_A$ is higher than the existing gate voltage, $V_{GATE}$, the diode D1 conducts charging capacitor C3 through the resistor divider form by R1 and R2. The resistor divider sets the upper voltage limit at which the gate is charged. Preferably, the reactor turns ratio N2/N1 and resistor divider R2/R1 is set to boost the voltage at the gate of MOSFET Q1 such that it will be fully enhanced. The equivalent circuit at this state is shown in FIG. 4. It is noted that the ratio N2/N1 allows a high voltage to charge up capacitor C3 during Q2's off time, (1−D)T, to turn on the gate of MOSFET Q1.

When $V_A$ is lower than the existing $V_{GATE}$, the diode D1 is off. The capacitor C3 is allowed to slowly decay through R1 and VR2 as shown in equivalent circuit in FIG. 5. However, in an alterative embodiment, if C3 and R1 are designed large enough such that its gate voltage decay is minimized during Q2's on time, then the MOSFET Q1 would remain in the fully enhanced state for the remainder of the period.

An Exemplary Transient Protection Circuit with Modeled Parameters

For illustrative purposes of the present invention, the exemplary transient protection circuit (3) depicted in FIGS. 3A-C is modeled according to a chosen set design parameters. It is noted that the buck converter components are idealized for simplification. For exemplary purposes, the assumed set of design parameters may be as follows:

$V_{IN} = 28V$ $I_{OUT} = 3 A$ $F = 200$ kHz $T = 5$ uS $V_{OUT} = 7V$ $D = V_{OUT}/V_{IN} = 7V/28V = 0.25$

DT=1.25 uS FET ON TIME (1−D)T=3.75 uS FET OFF TIME

N2/N1=2

Figure 5:
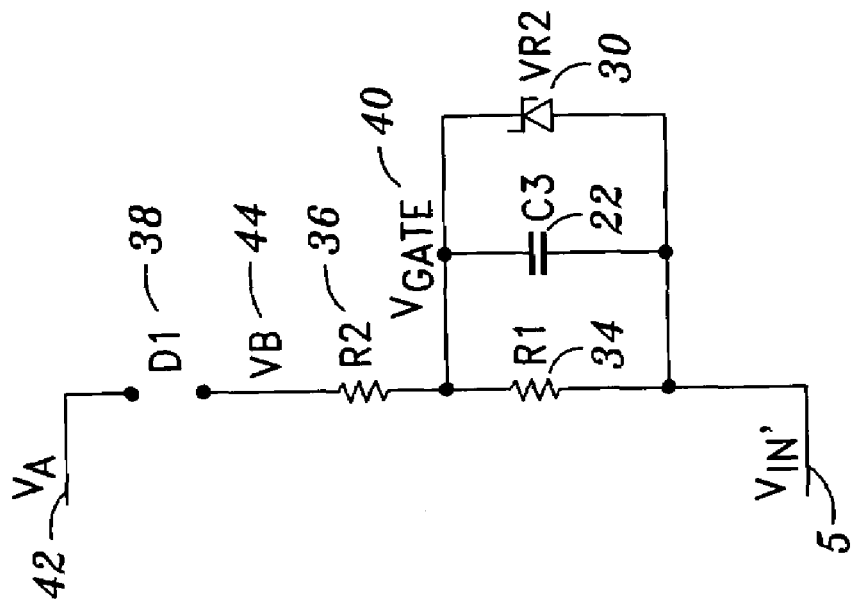
FIG. 5 is an equivalent circuit between $V_A$ and $V_{IN}'$ when capacitor C3 is allowed to slowly decay through R1 and VR2, according to an aspect of the present invention.

From the equivalent circuit depicted in FIG. 5, one can write the following equations:

0≤t≤DT $V_{GATE}=V_\infty e^{-t/\tau 1}$

τ1=R1*C3

Q2:ON

C3:Discharge

From the equivalent circuit depicted in FIG. 4, one can write the following equations:

DT≤t≤T $V_{GATE}=V_\infty(1-e^{-t/\tau 2})$

τ2=(R1//R2)*C3

Q2:OFF

C3:Charge

It is noted that $V_\infty$ is the peak charge voltage on the gate of MOSFET Q1 and $V_\infty$ is set to 35V to fully enhance the MOSFET Q1 (VGS=7V).

Furthermore, it is preferable that, τ2<τ1. The time constant during the charge interval preferably is smaller than the time constant during the discharge interval. This is done to ensure that V_GATE will charge up to $V_\infty$ to fully turn on MOSFET Q1 faster than it discharges its voltage because a smaller time constant equates to faster charging time. In other words, preferably C3 charges up faster than it discharges, before Q1 can be fully enhanced. Otherwise, Q1 will not reach its fully enhanced mode.

Once the transient protection circuit (3) reaches its steady state condition (when Q1 is fully enhanced), it is preferable to hold the V_GATE to a value greater than V_IN for the entire discharge interval. This is implemented to make sure that Q1 does not exit its fully enhance mode. This may be accomplished by setting τ2<<τ1.

The V_GATE can be set to charge up to $V_\infty$ of 35V by setting resistor values for R1 and R2. Analyzing the circuit for DT≤t≤T in steady state we get the following set of equations.

DT≤t≤T

Vin'≈Vin=28V (Q1=FULLYENHANCED)

$V_{GATE}=V_{in}+V_{GS}=28V+7V=35V$ $V_1=V_{SW}-V_{out}=0V-7V=-7V$ $V_2 = \frac{N_2}{N_1} * V_1 = 2 * -7V = -14V$ $V_A=Vin'-V_2=28V-(-14V)=42V$ By applying the voltage V_A and V_IN' to FIG. 4, one can clearly see that V_GATE can be set to charge to $V_\infty$ of 35V by setting R1=1k and R2=1k.

In the instant example, the capacitor C3 will discharge for 1.25 uS in one period. The value of C3 is determined by choosing a capacitor such that its discharge voltage is insignificant for this time interval. If C3=10 uF, then the gate voltage will discharge to $$35e^{\frac{-1.25uS}{1K*10uF}} = 34.995V$$

at the end of that interval. This is clearly above the input voltage of 28V. Therefore, it is assured that the average of the gate voltage is around 35V and the MOSFET Q1 remains in the fully enhanced mode. The zener diode VR2 is inserted to protect the gate-source junction of Q1. If VGS of Q1 exceeds 15V, then VR2 is on; otherwise, VR2 is off.

Figure 6A:
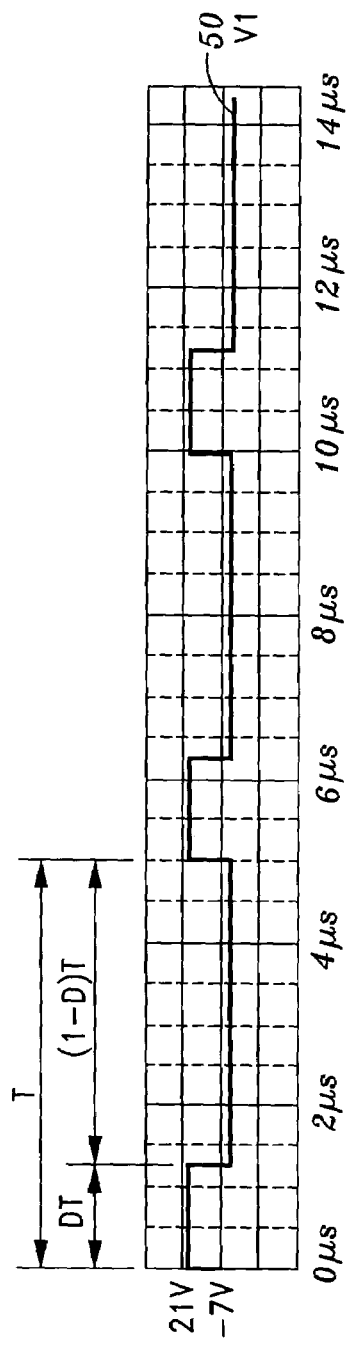
FIGS. 6A-D depicts resulting waveforms from an exemplary buck converter, according to an aspect of the present invention.
Figure 6B:
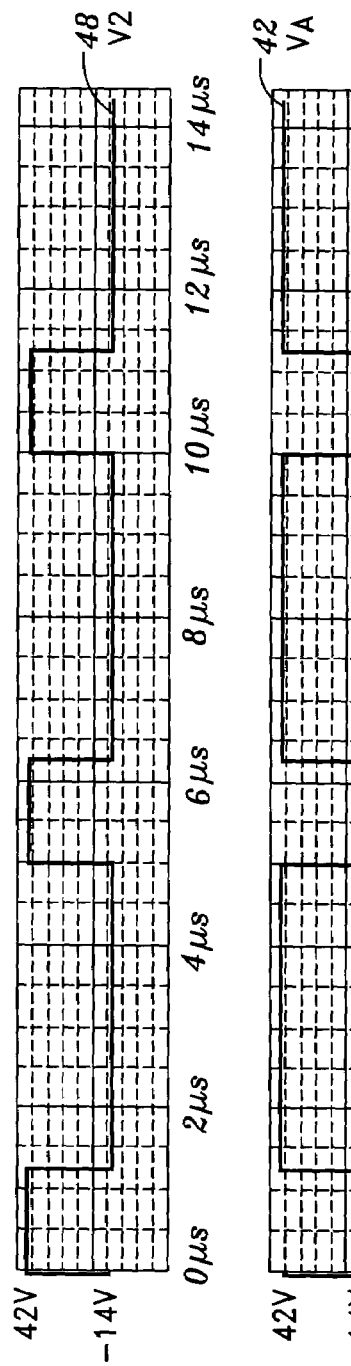
Figure 6C:
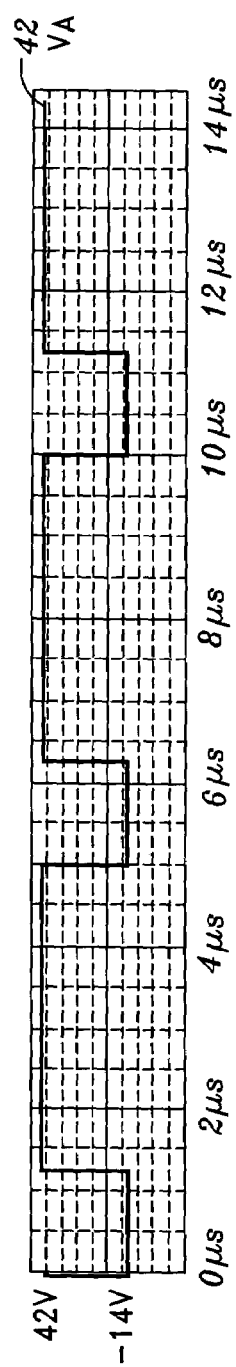
Figure 6D:
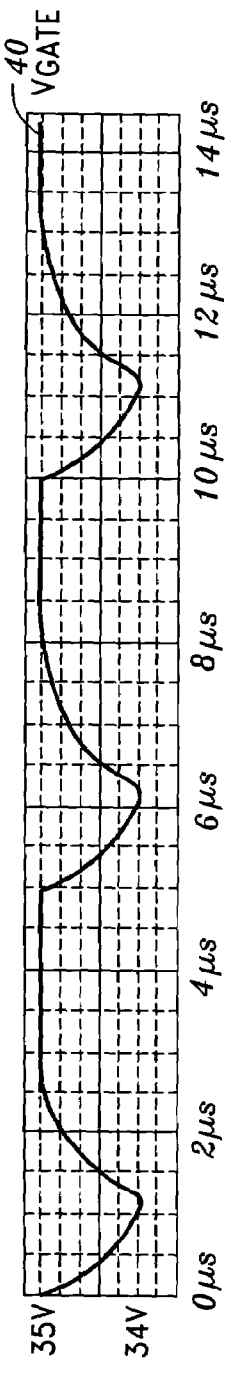

The waveforms for the aforementioned example, V1, V2, V_A, are depicted in FIGS. 6A through 6D. The waveform V_GATE is illustrated in an exaggerated fashion to indicate its charge/discharge phenomenon. FIG. 6A shows the voltage V1 is across the primary inductor L1. Its voltage swing is from +21V during Q2's on time (DT) to −7V during Q2's off time T(1−D). FIG. 6B shows the voltage across the secondary of inductor L1 is V2. Since N2/N1=2, V2 will be twice that of V1. FIG. 6C is a single ended waveform (relative to ground) of V_A which is V_IN'−V2. FIG. 6D shows the charge and discharge of the gate voltage. The waveform is illustrated in an exaggerated fashion to indicate its charge/discharge phenomenon.

One aspect of the present invention is that the voltage at V_IN' is clamped by programmable a zener diode voltage. In particular, the transient protection circuit (3) depicted in FIGS. 3A-C serves as a line transient protection circuit by the addition of a zener diode VR1 at the gate of MOSFET Q1. This enables the transient protection circuit (3) to clamp a line transient to a maximum set voltage. The maximum clamping voltage is set by selecting the zener voltage of VR1. The second zener diode, VR2, connected from gate to source of MOSFET Q1 is used to protect the gate-source of the MOSFET Q1. When a transient is encountered that exceeds the maximum voltage rating of zener diode VR1, zener diode VR1 turns on clamping the gate of MOSFET Q1 to the maximum set voltage of the zener diode VR1. With MOSFET Q1 fully enhanced, the source voltage of Q1 at node V_IN' will be clamped to the clamped voltage of VR1 minus VGS. V_IN' (clamped) is the voltage at node V_IN' during the onset of a transient. The aforementioned relationship may be described as follows:

V_IN'(clamped)=VR1(programmable clamped voltage)−VGS

Figure 7B:
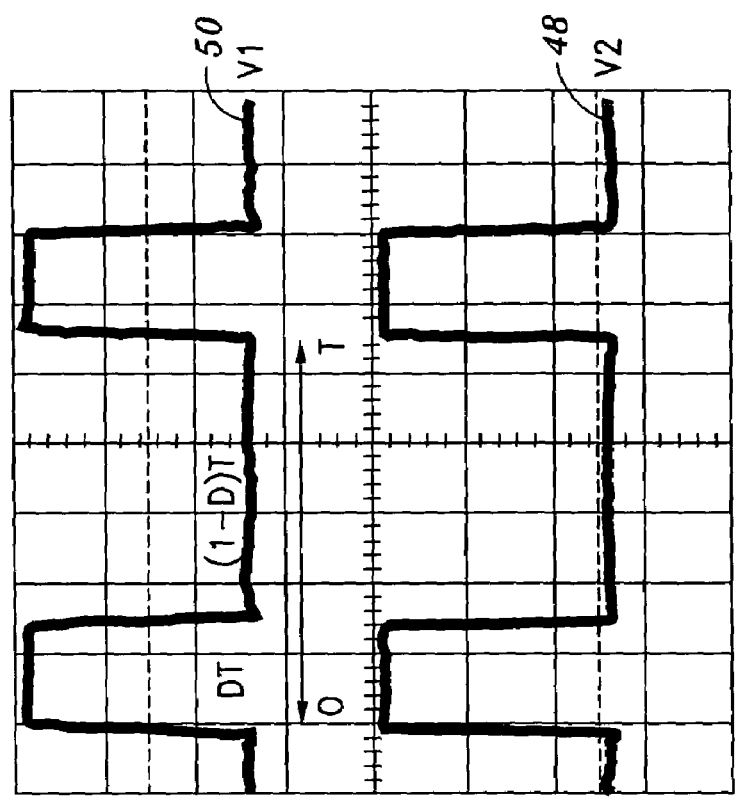
FIGS. 7A-G depicts the present invention in steady state and transient operation based upon a variety selected circuit parameters, according to an aspect of the present invention.
Figure 7A:
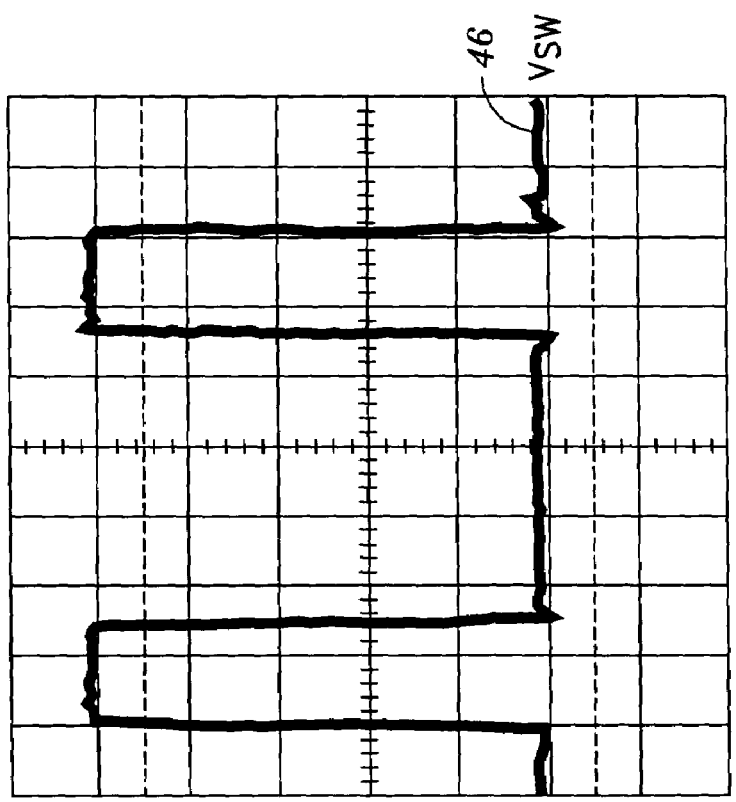
Figure 7D:
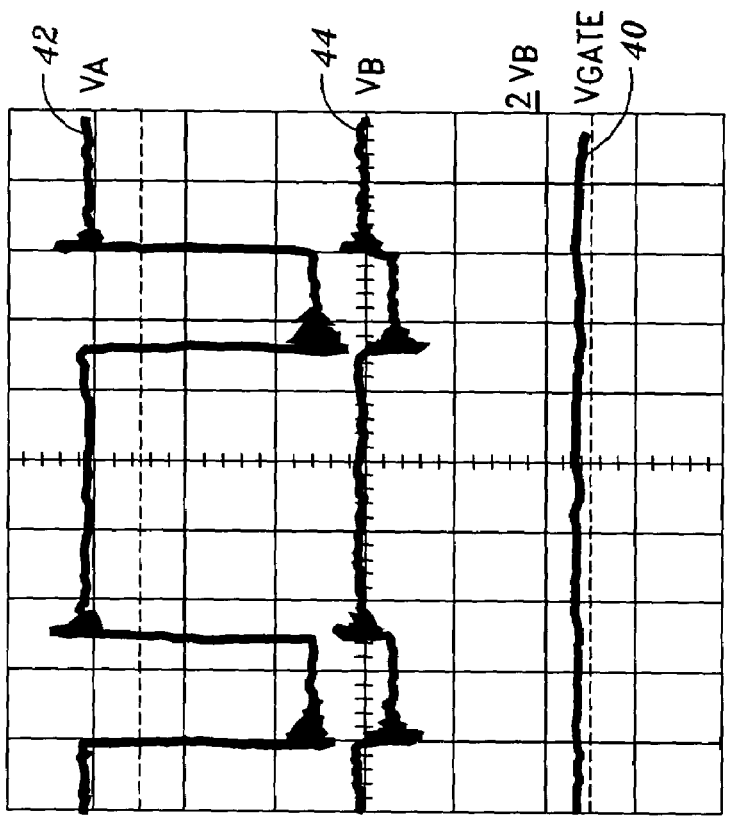
Figure 7C:
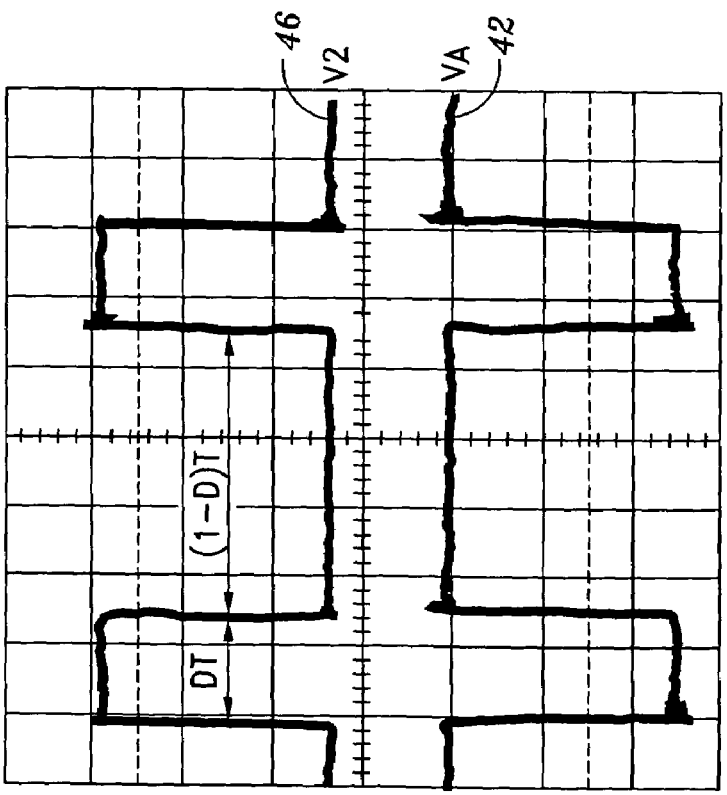
Figure 7F:
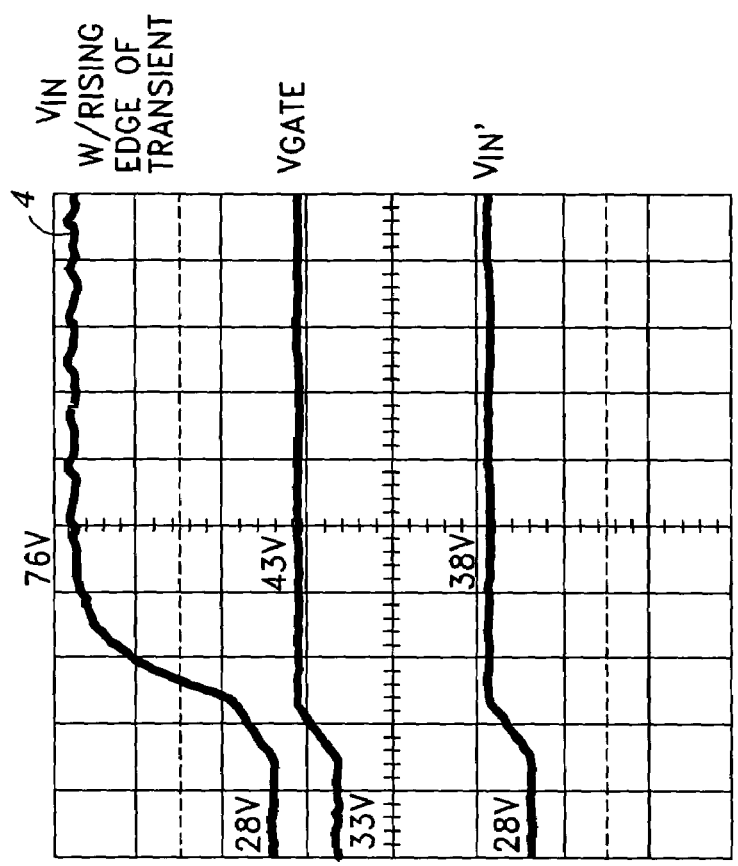
Figure 7E:
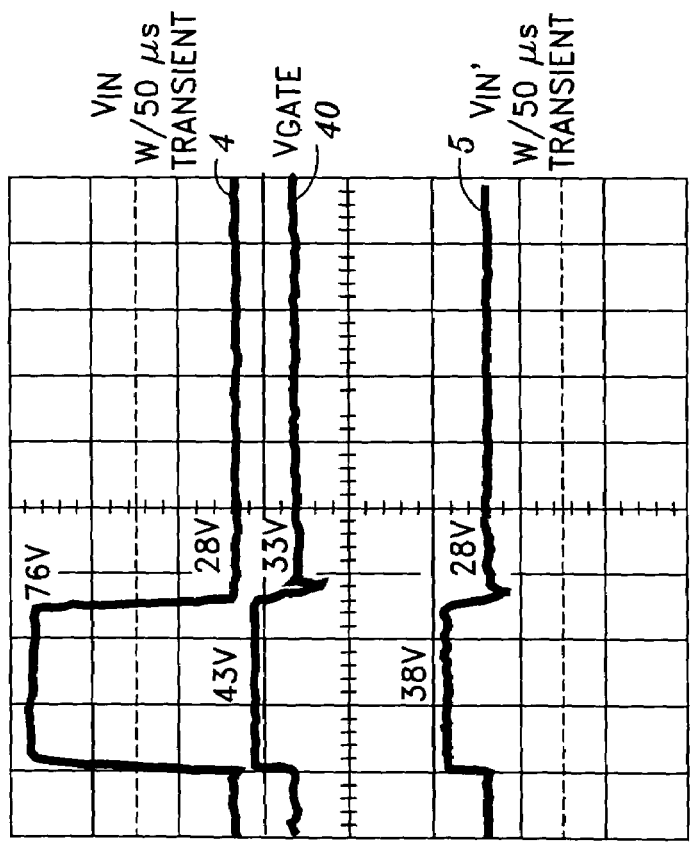
Figure 7G:
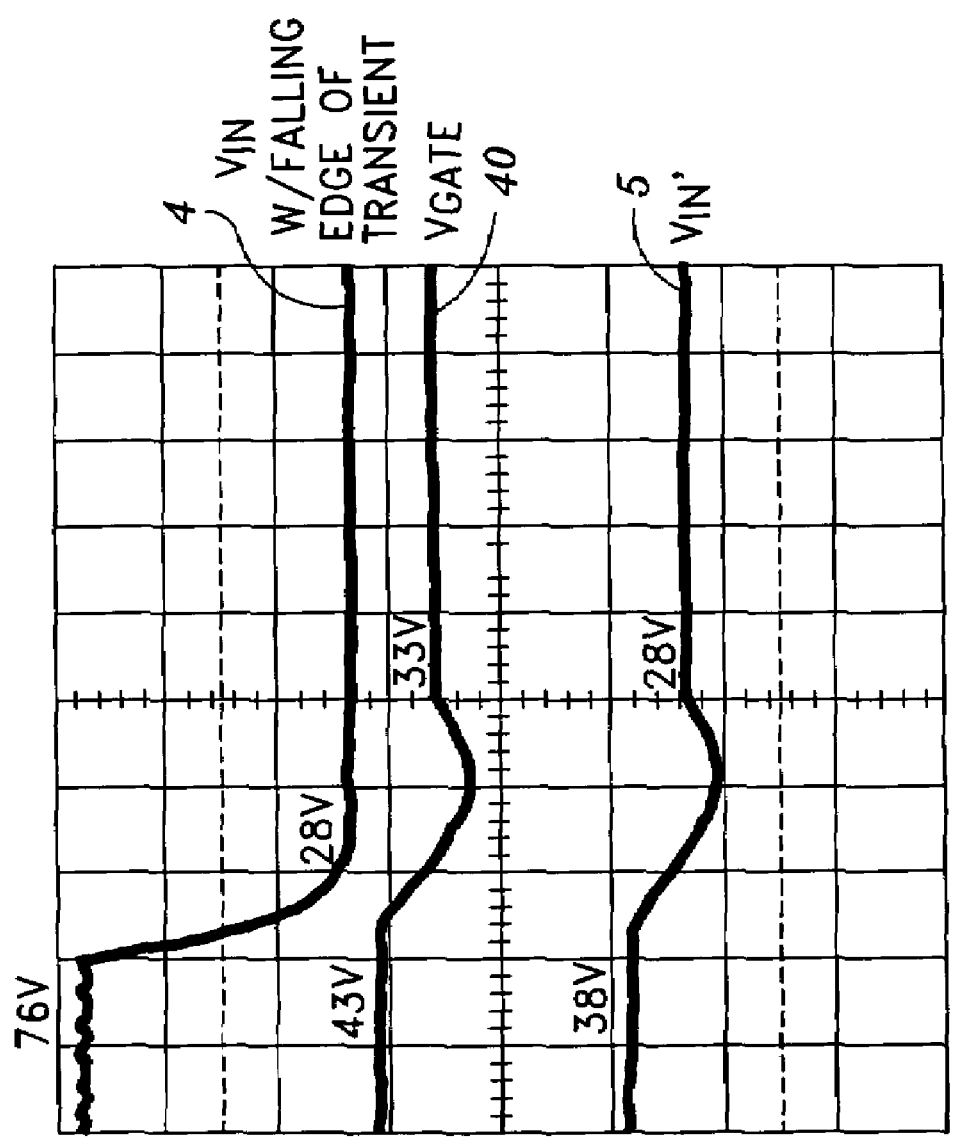

For example, in FIG. 7E, a 76V transient is injected into the line input. The programmable clamped voltage of VR1 is set at 43V. Therefore, at the onset of a transient, V_GATE is clamped to 43V. V_IN' is then clamped at V_GATE−VGS=38V. FIG. 7F and FIG. 7G shows the close up of the rising and falling edge of the transient respectively.

The transient protection circuit (3) is also more efficient because the MOSFET Q1 operates in the fully enhanced mode. The power saving of this circuit can be significant in comparison to the prior art transient protect circuits. To illustrate the present invention's power efficiency characteristics compared to the power efficiency characteristics of prior art transient protection circuits, a comparison test is herein presented below.

Figure 1:
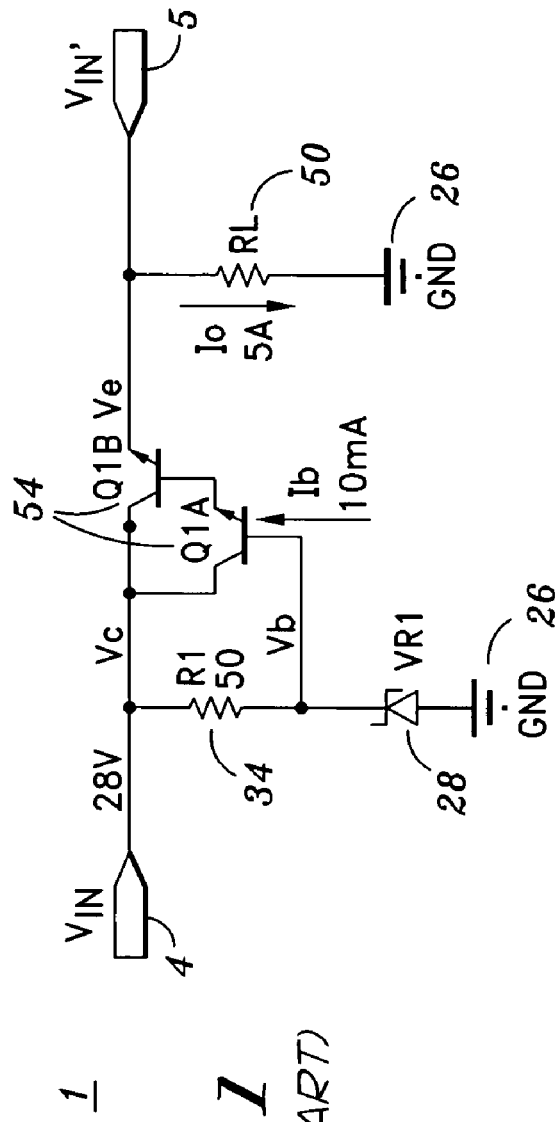
FIG. 1 depicts a prior art darlington power transistor protection circuit, according to an aspect of the present invention.
Figure 2:
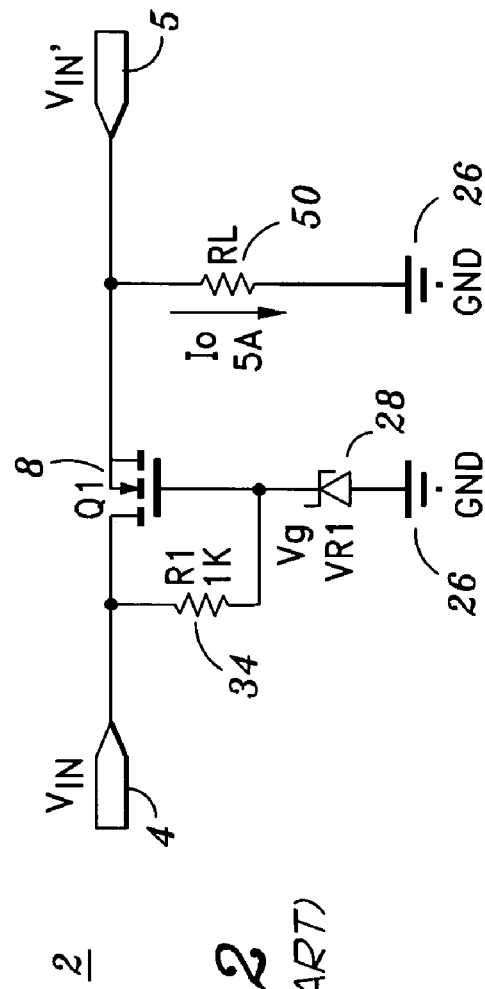
FIG. 2 depicts a prior art power MOSFET transient protection circuit, according to an aspect of the present invention.

Comparison of Prior Art Transient Protection Circuits to the Present Invention Transient Protection Circuit To illustrate the power efficiency gains that the present invention has over the prior art, it is beneficial to compare each transient protection circuit (darlington from FIG. 1; power MOSFET from FIG. 2, and the present invention transient protection circuit (3) from FIGS. 3A-C). To accomplish this comparison test, a common set of input parameters are utilized.

a. Darlington Type Transient Protection Circuit (FIG. 1)

A calculation of the power dissipation of the darlington circuit (1) with an example parameter reveals that the power dissipation of the darlington transistor is close to 10 W. The parameters and calculations are as follows:

Vin=28V

Io=5 A

Hfe_Q1(typical)=500

$$Ib = \frac{Ic}{Hfe} = \frac{5\text{ A}}{500} = 10\text{ mA}$$

Vbe_on=1.4V(typical)

Vc=28V $Vb=Vc-(Ib*R1)=28*(0.010\text{ A}*50\text{ ohms})=27.5V$ $Ve=Vb-Vbe\_on=27.5V-1.4V=26.1V$ $Vce=Vc-Ve=28V-26.1V=1.9V$ PowerDissipation_$Q1=(Vce*Ic)+(Vbe*Ib)=(1.9V*5\text{ A})+(1.4V*0.010\text{ A})=9.514\text{ W}$ b. Power MOSFET Type Transient Protection Circuit (FIG. 2)

A calculation of the power dissipation of the power MOSFET transient protection circuit (3) with an example parameter set reveals that the power dissipation of the power MOSFET transient protection circuit is 20 W. The dissipation is at 20 W because the FET is not fully enhanced. Applying the same parameters as in the last example, the power consumption was calculated as follows:

Vin=28V

Io=5 A

Vg=28V

Vgatethreshold=4V $Vin'=Vg-Vgatethreshold=28V-4V=24V$

PowerDissipation_$Q1=(Vin-Vin')*Id=4V*5\text{ A}=20\text{ W}$ c. The Present Invention Transient Protection Circuit (FIG. 3)

A calculation of the power dissipation of the present invention transient protection circuit (3) with the same example parameter set reveals that the power dissipation of the present invention transient protection circuit (3) is only 0.375 W. This power savings is realized because the MOSFET Q1 is fully enhanced. Its dissipation is purely dependent on the channel resistance ($r_{DS\_ON}$) of the MOSFET. By applying the same parameters as in the last two examples, the power consumption was calculated as follows:

Vin=28V

Io=5 A

Vg=35V

Rds_on=0.015 ohms(typical)

$Vin'=Vin-(Io*Rds\_on)=28-(0.015\text{ ohm}*5\text{ A})=27.925V$

PowerDissipation_$Q1=(Io^2*Rds\_on)=25*0.015=0.375\text{ W}$

Waveforms Taken from the Present Invention Transient Protection Circuit with Exemplary Parameters FIGS. 7A-G depict a series of waveforms which are taken from an exemplary modeled transient protection circuit (3) from FIGS. 3A-C utilizing the following parameters:

$V_{IN}$=+28V (50 mS of transient peak at 76V)

$V_{OUT}$=7V@3 A

L1=20 uH

N2/N1=2

R1=1K

R2=1K

C3=68 uF

VR1=43V zener voltage

VR2=15V zener voltage

FIG. 7A shows the voltage waveform Vsw relative to ground. FIGS. 7B-D shows the progression of voltage waveforms from the switching voltage across primary inductor L1 to the boosted DC voltage at the gate to fully enhance the MOSFET Q1.

Alternative Load Circuit Embodiments

The advantages of the load circuit (9) described herein can alternatively be gained with the load being that of any other equivalent load circuit that takes the form of a variety of topology of load circuits known in the art. FIGS. 8A-D depict various exemplary embodiments of the highly efficient line transient protection circuit (3) for high power loads using alternative load circuits (9), including a simple oscillator circuit, and various switching regulator circuits. For example, the load circuit (9) may be oscillator and transformer circuit (58; see FIG. 8A), boost converter (60; see FIG. 8B), push-pull and transformer circuit (62; see FIG. 8C), or a push-pull circuit and tertiary winding on an inductor circuit (64; see FIG. 8D).

FIG. 8A depicts the load circuit (9) of the present invention as a simple oscillator circuit and a transformer (58). A switching waveform is generated across the primary of the transformer T1 (16). In this case an oscillator U1 (14) is provided instead of a regulator controller. A switching waveform is then developed on the secondary winding N2, which is used to generate a voltage to fully enhance the MOSFET Q1 (8). The oscillator circuit (58) also includes a capacitor C2 (20) and switching FET Q3 (12).

FIG. 8B depicts the load circuit (9) of the present invention as a boost converter (60). As previously discussed in the specification, the circuit (3) takes advantage of the switching voltage waveform developed across a boost inductor, utilizing a tertiary winding to generate a voltage to fully enhance the MOSFET Q1 (8). The boost converter (60) circuit also includes a capacitor C2 (20), regulator controller U1 (14), switching FET Q3 (12), diode D2 (51), and capacitor C4 (24).

FIG. 8C embodies the invention using a push-pull circuit (62) and a transformer T1 (16). A switching waveform is generated across the primary winding N1 of the transformer T1 (16). A switching waveform is then developed on the secondary winding N2, which is used to generate a voltage to fully enhance the MOSFET Q1 (8). The push-pull circuit (62) also includes a capacitor C2 (20), regulator controller U1 (14), switching FETs Q2 (10) and Q3 (12), diodes D2 (51), D3A (53), D3B (55), inductor L1 and capacitor C4 (24).

FIG. 8D embodies the invention using a push-pull circuit (64) and a tertiary winding on an inductor L1. As discussed previously in the specification, the circuit (3) takes advantage of the switching voltage waveform developed across the inductor L1, utilizing a tertiary winding to generate a voltage to fully enhance the MOSFET Q1 (8). The push-pull circuit (64) also includes a capacitor C2 (20), regulator controller U1 (14), switching FETs Q2 (10) and Q3 (12), diodes D3A (53), D3B (55), and capacitor C4 (24).

It is even further noted that the scope of the present invention is not and should not be limited to the embodiments illustrated in FIGS. 3A-C and FIGS. 8A-D. Rather, FIGS. 3A-C and FIGS. 8A-D depict a few of many forms or topologies of various of load circuits (9) which may be incorporated as a feature of the present invention. Persons knowledgeable in the art will be able to embody the present invention using the exemplary embodiments of load circuits (9) or other exemplary embodiments of load circuits not specifically depicted in the instant application, such as, e.g. single-ended forward converters, half-bridge converters, full-bridge converters, and various switching regulator circuits.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A transient protection circuit for high power loads, comprising:
    a primary circuit leg having an input $V_{IN}$ in electrical communication with a drain of a MOSFET Q1 and a source of the MOSFET Q1 being an output of the primary circuit;
    a load circuit having an input $V_{IN}'$ in electrical communication with the output of the primary circuit leg, the load circuit having a winding N1 forming a portion of one of an inductor L1 or a transformer T1; and
    a secondary circuit in electrical communication with a gate of the MOSFET Q1 and in electrical communication with a zener diode VR1 and wherein the zener diode VR1 is electrically grounded, a circuit leg $V_{GATE}$ in electrical communication with a node between the gate of MOSFET Q1 and the zener diode VR1 being in electrical communication with a resistor R2, a circuit leg $V_B$ in electrical communication with resistor R2 and in electrical communication with a diode D1, a circuit leg $V_A$ in electrical communication with diode D1 and with a first terminal of a winding N2 forming a portion of the one of an inductor L1 or a transformer T1, and wherein another terminal of the N2 winding is in electrical communication with the input $V_{IN}'$ of the load circuit.

2. The transient protection circuit according to claim 1, the load circuit further comprising an output $V_{OUT}$.

3. The transient protection circuit according to claim 1, wherein the load circuit comprises a switching regulator circuit.

4. The transient protection circuit according to claim 1, wherein the load circuit comprises an oscillator circuit.

5. The transient protection circuit according to claim 2, wherein the load circuit comprises a push-pull circuit.

6. The transient protection circuit according to claim 2, wherein the load circuit comprises a boost converter circuit.

7. The transient protection circuit according to claim 2, wherein the load circuit comprises a buck converter circuit.

8. The transient protection circuit according to claim 7, wherein the buck converter comprises the input $V_{IN}'$ in electrical communication with a drain of a FET Q2, a circuit leg $V_{SW}$ in electrical communication with a source of FET Q2 and in electrical communication with a terminal of the winding N1 of the inductor L1, the output $V_{OUT}$ in electrical communication with another terminal of the winding N1, a FET Q3 having a drain in electrical communication with the circuit leg $V_{SW}$ and source of the FET Q3 being electrically grounded, a regulator controller U1 in electrical communication with a gate of the FET Q2 and with a gate of the FET Q3 and wherein a source of the FET Q3 is electrically grounded.

9. The transient protection circuit according to claim 2, further comprising a capacitor C2 in electrical communication with the input $V_{IN}'$ and further electrically grounded.

10. The transient protection circuit according to claim 2, further comprising a capacitor C4 in electrical communication with the output $V_{OUT}$ and further electrically grounded.

11. The transient protection circuit according to claim 1, further comprising a resistor R1 in electrical communication with the input $V_{IN}$ upstream the drain of MOSFET Q1 and in electrical communication with the secondary circuit leg upstream the node between the gate of MOSFET Q1 and the zener diode VR1.

12. The transient protection circuit according to claim 1, further comprising a capacitor C3 in electrical communication with the primary circuit downstream the source of MOSFET Q1 and in electrical communication with the circuit leg $V_{GATE}$ upstream the resistor R2.

13. The transient protection circuit according to claim 1, further comprising a zener diode VR2 in electrical communication with the primary circuit downstream the source of MOSFET Q1 and in electrical communication with the circuit leg $V_{GATE}$ upstream the resistor R2.

14. The transient protection circuit according to claim 1, further comprising a capacitor C1 in electrical communication with the input $V_{IN}$ upstream the drain of Q1 and further electrically grounded.

15. The transient protection circuit according to claim 1, wherein a programmable voltage clamp is implemented through zener diode VR1.

16. A transient protection circuit for high power loads, comprising:
 a primary circuit leg comprising an input V$_{IN}$ in electrical communication with a drain of a MOSFET Q1 and a source of the MOSFET Q1 being an output of the primary circuit, and a capacitor C1 in electrical communication with the input V$_{IN}$ upstream the drain of Q1 and further electrically grounded;
 a load circuit comprising an input V$_{IN}$', a winding N1 forming a portion of an inductor L, and an output V$_{OUT}$, wherein input V$_{IN}$' is in electrical communication with the output of the primary circuit; and
 a secondary circuit in electrical communication with a gate of the MOSFET Q1 and in electrical communication with a zener diode VR1 and wherein the zener diode VR1 is electrically grounded, a circuit leg V$_{GATE}$ in electrical communication with a node between the gate of MOSFET Q1 and the zener diode VR1 and in electrical communication with a resistor R2, a circuit leg V$_B$ in electrical communication with resistor R2 and in electrical communication with a diode D1, a circuit leg V$_A$ in electrical communication with diode D1 and with a negative terminal of a winding N2 forming a portion of the inductor L1 and wherein a positive terminal of the N2 winding is in electrical communication with the input VIN', a capacitor C3 in electrical communication with the primary circuit downstream the source of MOSFET Q1 and in electrical communication with the circuit leg V$_{GATE}$ upstream the resistor R2, a zener diode VR2 in electrical communication with the primary circuit leg V$_{GATE}$ upstream the capacitor C3, and a resistor R1 in electrical communication with the input V$_{IN}$ upstream the drain of MOSFET Q1 and in electrical communication with the secondary circuit leg upstream the node between the gate of MOSFET Q1 and the zener diode ZR1.

17. The transient protection circuit according to claim 16, wherein the load circuit comprises a switching regulator circuit.

18. The transient protection circuit according to claim 16, wherein the load circuit comprises a load circuit containing an oscillator.

19. The transient protection circuit according to claim 16, wherein the load circuit comprises a push-pull circuit.

20. The transient protection circuit according to claim 16, wherein the load circuit comprises a boost converter circuit.

21. The transient protection circuit according to claim 16, wherein the load circuit comprises a buck converter circuit.

22. The transient protection circuit according to claim 16, wherein a programmable voltage clamp is implemented through zener diode VR1.

23. A transient protection circuit for high power loads, comprising:
 a primary circuit leg comprising an input V$_{IN}$ in electrical communication with a drain of a MOSFET Q1 and a source of the MOSFET Q1 being an output of the primary circuit, and a capacitor C1 in electrical communication with the input V$_{IN}$ upstream the drain of Q1 and further electrically grounded;
 a load circuit comprising a buck converter including an input V$_{IN}$' in electrical communication with a drain of a FET Q2, a circuit leg V$_{SW}$ in electrical communication with a source of FET Q2 and in electrical communication with a positive terminal of a winding N1 of an inductor L1, an output V$_{OUT}$ in electrical communication with a negative terminal of the winding N1, a FET Q3 having a drain in electrical communication with the circuit leg V$_{SW}$ and source of the FET Q3 being electrically grounded, a regulator controller U1 in electrical communication with a gate of the FET Q2 and with a gate of the FET Q3 and wherein a source of the FET Q3 is electrically grounded, a capacitor C2 in electrical communication with the input V$_{IN}$' and further electrically grounded, and a capacitor C4 in electrical communication with the output V$_{OUT}$ and further electrically grounded; and
 a secondary circuit in electrical communication with a gate of the MOSFET Q1 and in electrical communication with a zener diode VR1 and wherein the zener diode VR1 is electrically grounded, a circuit leg V$_{GATE}$ in electrical communication with a node between the gate of MOSFET Q1 and the zener diode VR1 and in electrical communication with a resistor R2, a circuit leg V$_B$ in electrical communication with resistor R2 and in electrical communication with a diode D1, a circuit leg V$_A$ in electrical communication with diode D1 and with a negative terminal of a winding N2 forming a portion of the inductor L1 and wherein a positive terminal of the N2 winding is in electrical communication with the input VIN', a capacitor C3 in electrical communication with the primary circuit downstream the source of MOSFET Q1 and in electrical communication with the circuit leg V$_{GATE}$ upstream the resistor R2, a zener diode VR2 in electrical communication with the primary circuit leg V$_{GATE}$ upstream the capacitor C3, and a resistor R1 in electrical communication with the input V$_{IN}$ upstream the drain of MOSFET Q1 and in electrical communication with the secondary circuit leg upstream the node between the gate of MOSFET Q1 and the zener diode VR1.

24. The transient protection circuit according to claim 22, wherein a programmable voltage clamp is implemented through zener diode VR1.

25. A portion of a transient protection circuit for high power loads, comprising:
 a primary circuit leg having an input V$_{IN}$ in electrical communication with a drain of a MOSFET Q1 and a source of the MOSFET Q1 being an output of the primary circuit adapted to be connected to a load circuit having an input V$_{IN}$';
 a secondary circuit in electrical communication with a gate of the MOSFET Q1 and in electrical communication with a zener diode VR1 and wherein the zener diode VR1 is electrically grounded, a circuit leg V$_{GATE}$ in electrical communication with a node between the gate of MOSFET Q1 and the zener diode VR1 being in electrical communication with a resistor R2, a circuit leg V$_B$ in electrical communication with resistor R2 and in electrical communication with a diode D1, a circuit leg V$_A$ in electrical communication with diode D1 and with a first terminal of a winding N2 forming a portion of the one of an inductor L1 or a transformer T1, and wherein another terminal of the N2 winding is adapted to be in electrical communication with the input VIN' of the load circuit.

26. The transient protection circuit according to claim 24, further comprising a resistor R1 in electrical communication with the input V$_{IN}$ upstream the drain of MOSFET Q1 and in electrical communication with the secondary circuit leg upstream the node between the gate of MOSFET Q1 and the zener diode VR1.

27. The transient protection circuit according to claim 24, further comprising a capacitor C3 in electrical communication with the primary circuit downstream the source of MOSFET Q1 and in electrical communication with the circuit leg V$_{GATE}$ upstream the resistor R2.

28. The transient protection circuit according to claim 24, further comprising a zener diode VR2 in electrical communication with the primary circuit downstream the source of MOSFET Q1 and in electrical communication with the circuit leg V$_{GATE}$ upstream the resistor R2.

29. The transient protection circuit according to claim 24, further comprising a capacitor C1 in electrical communication with the input V$_{IN}$ upstream the drain of Q1 and further electrically grounded.

* * * * *